US012007168B2

(12) United States Patent
Shin

(10) Patent No.: US 12,007,168 B2
(45) Date of Patent: Jun. 11, 2024

(54) COMBUSTION HEAT GENERATOR WITH RECIRCULATION REGION

(71) Applicant: Kookmin University Industry Academy Cooperation Foundation, Seoul (KR)

(72) Inventor: Dong Hoon Shin, Seoul (KR)

(73) Assignee: Kookmin University Industry Academy Cooperation Foundation, Seoul (KR)

(*) Notice: Subject to any disclaimer, the term of this patent is extended or adjusted under 35 U.S.C. 154(b) by 0 days.

(21) Appl. No.: 17/618,143

(22) PCT Filed: Feb. 7, 2020

(86) PCT No.: PCT/KR2020/001779
§ 371 (c)(1),
(2) Date: Dec. 10, 2021

(87) PCT Pub. No.: WO2020/251133
PCT Pub. Date: Dec. 17, 2020

(65) Prior Publication Data
US 2022/0236010 A1 Jul. 28, 2022

(30) Foreign Application Priority Data
Jun. 12, 2019 (KR) ........................ 10-2019-0069631

(51) Int. Cl.
*F27D 99/00* (2010.01)
*F27B 7/36* (2006.01)
(Continued)

(52) U.S. Cl.
CPC ............ *F27D 99/0033* (2013.01); *F27B 7/36* (2013.01); *F27B 2009/128* (2013.01); *F27B 2009/3684* (2013.01)

(58) Field of Classification Search
CPC ................................. F23G 7/068; F23L 15/02
(Continued)

(56) References Cited

U.S. PATENT DOCUMENTS 3,810,732 A * 5/1974 Koch .................... F23C 99/006 431/170
6,029,910 A * 2/2000 Joshi ....................... C03B 7/065 239/404
(Continued)

FOREIGN PATENT DOCUMENTS

GB 2525942 A 11/2015
JP 07-218142 A 8/1995
(Continued)

OTHER PUBLICATIONS

International Search Report for PCT/KR2020/001779 dated May 15, 2020.
(Continued)

*Primary Examiner* — Steven B McAllister
*Assistant Examiner* — John E Bargero
(74) *Attorney, Agent, or Firm* — Sughrue Mion, PLLC

(57) ABSTRACT

Disclosed is a combustion heat generator with a recirculation region for forming uniform temperature distribution in a combustion chamber by forming a gas recirculation region around a central part of a combustion space in a housing and injecting fuel into the gas recirculation region to generate space combustion based on the recirculation region.

6 Claims, 7 Drawing Sheets

(51) Int. Cl.
*F27B 9/12* (2006.01)
*F27B 9/36* (2006.01)

(58) Field of Classification Search
USPC ........................................................ 431/8
See application file for complete search history.

(56) References Cited

U.S. PATENT DOCUMENTS

| | | | | |
|---|---|---|---|---|
| 6,450,162 | B1 | 9/2002 | Wang et al. | |
| 8,057,560 | B2 * | 11/2011 | Lee | H01M 8/0618 252/376 |
| 2007/0137259 | A1 * | 6/2007 | Borders | C03B 37/065 65/454 |
| 2009/0053660 | A1 * | 2/2009 | Mikus | F23N 1/02 422/198 |
| 2009/0130615 | A1 | 5/2009 | Penfornis et al. | |
| 2012/0328999 | A1 | 12/2012 | Braud et al. | |

FOREIGN PATENT DOCUMENTS

| | | | |
|---|---|---|---|
| JP | 10-141611 | A | 5/1998 |
| JP | 2002-22119 | A | 1/2002 |
| JP | 2005-188858 | A | 7/2005 |
| KR | 20-1994-0007372 | | 10/1994 |
| KR | 10-2004-0093272 | A | 11/2004 |
| KR | 10-2010-0061449 | A | 6/2010 |

OTHER PUBLICATIONS

Written Opinion for PCT/KR2020/001779 dated May 15, 2020.

Korean Office Action for Korean Patent Application No. 10-2019-0069631 dated Apr. 13, 2020.

Korean Notice of Allowance for Korean Patent Application No. 10-2019-0069631 dated Oct. 7, 2020.

Extended European Search Report dated Sep. 26, 2022 in Application No. 20823152.2.

* cited by examiner

[FIG. 1]
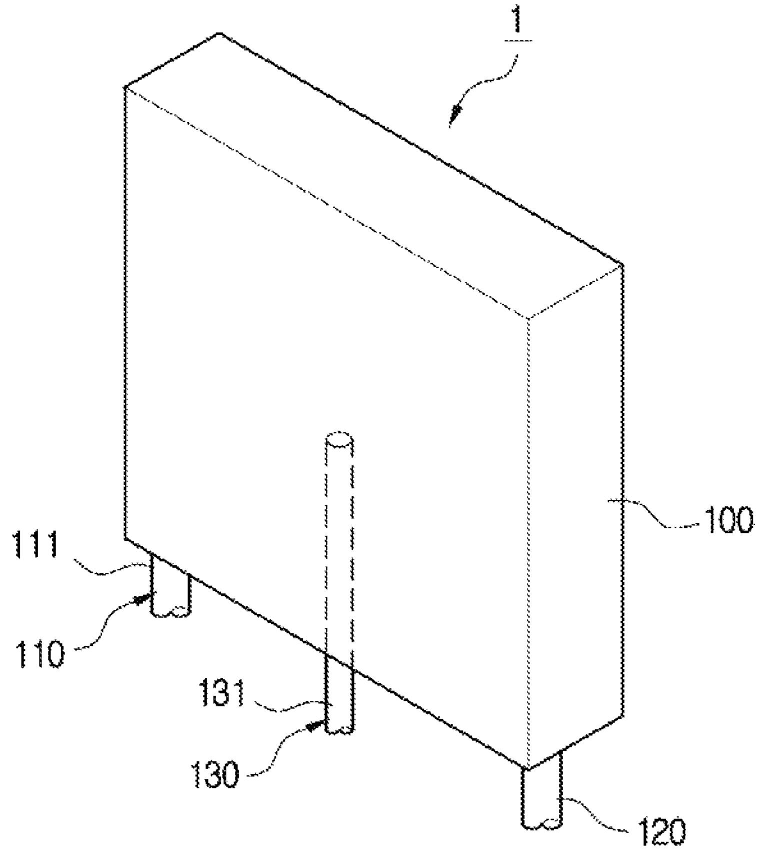

[FIG. 2]
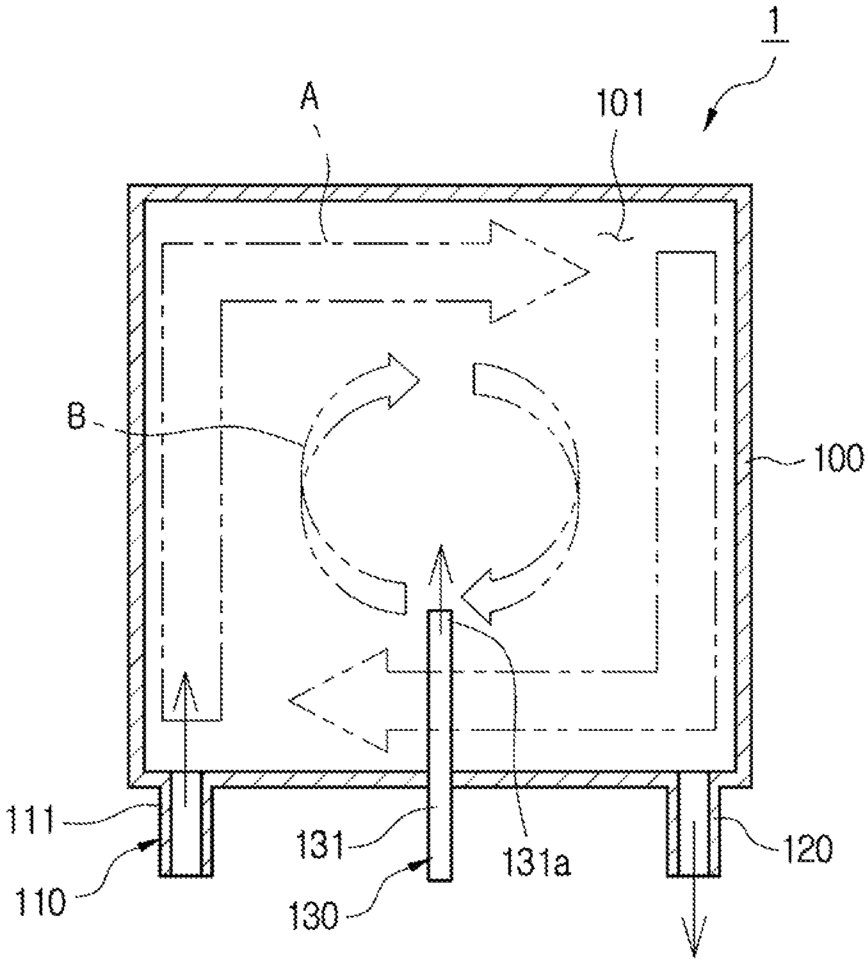

[FIG. 3]
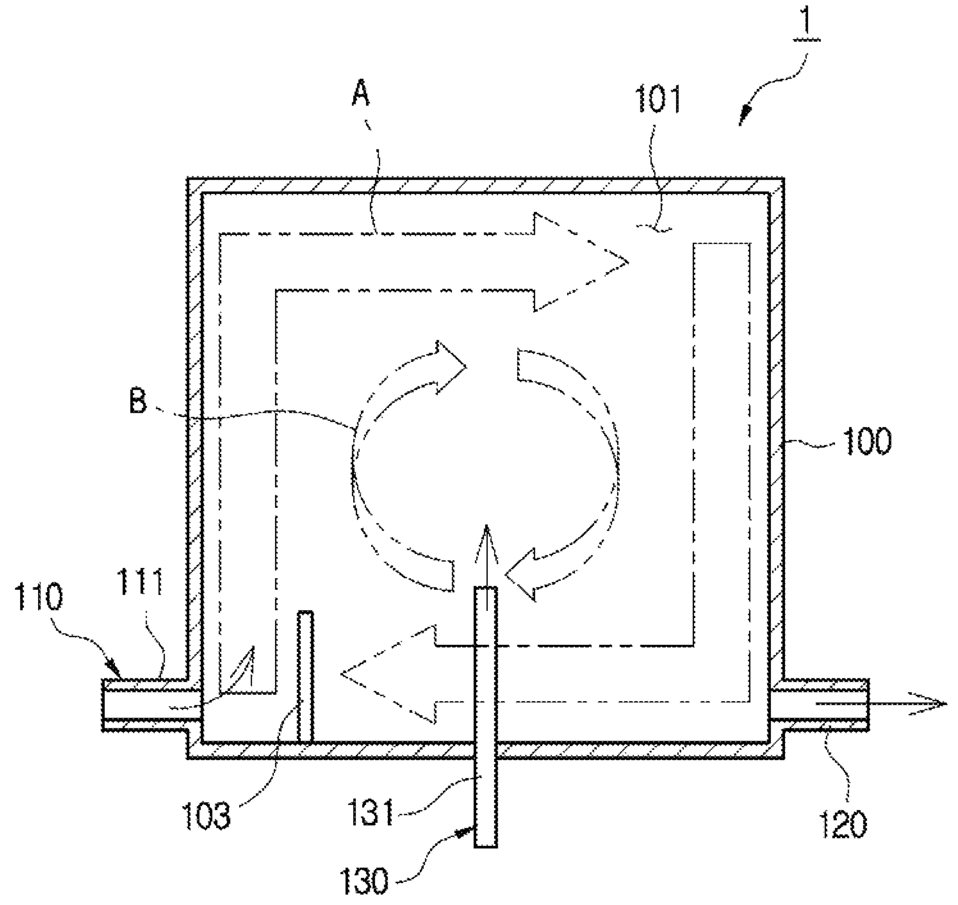

[FIG. 4]
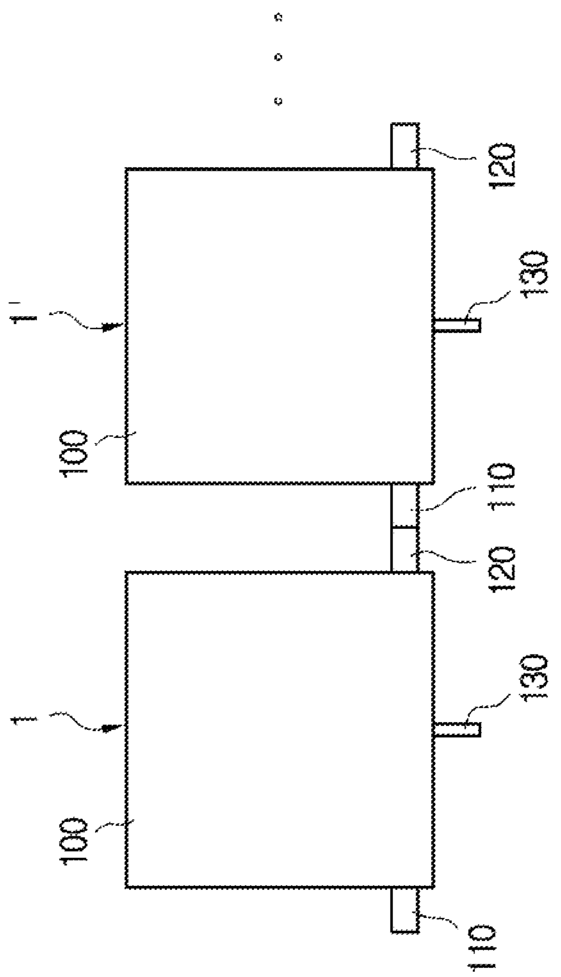

[FIG. 5]
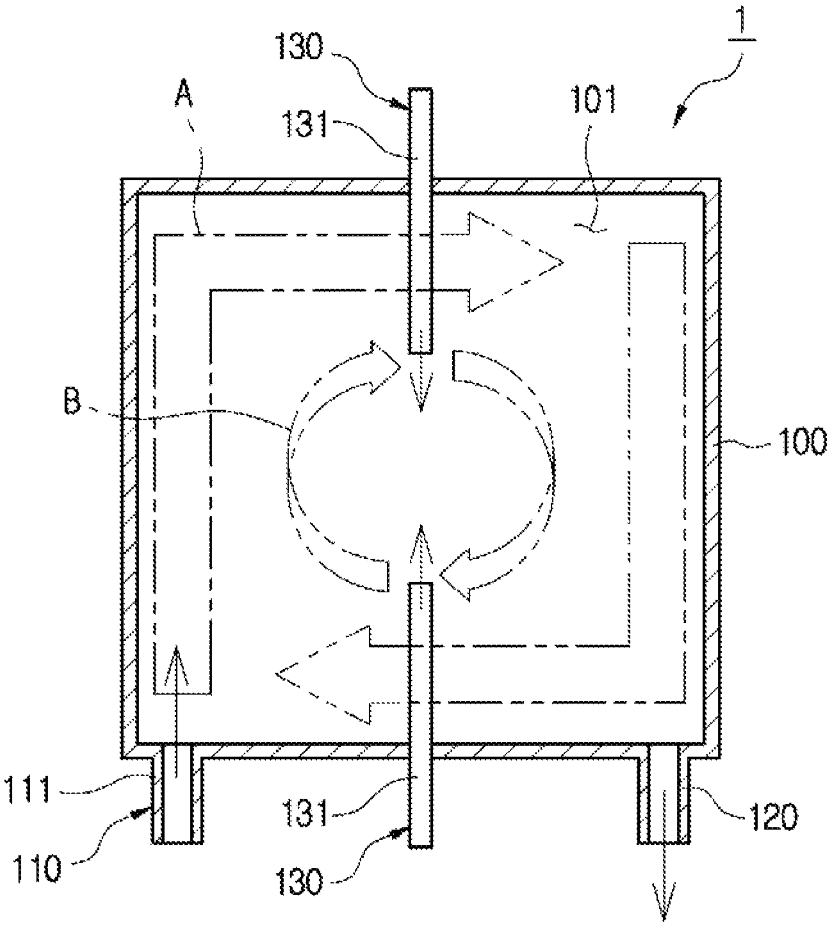

[FIG. 6]
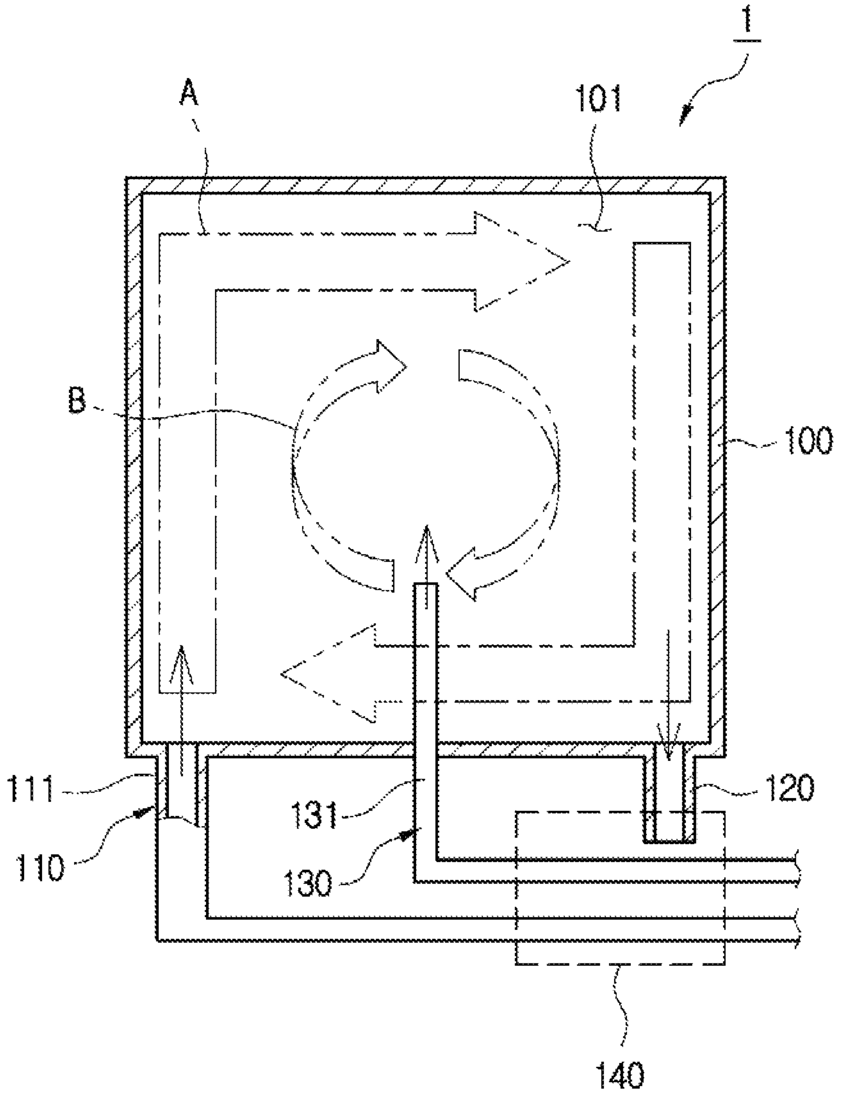

[FIG. 7]
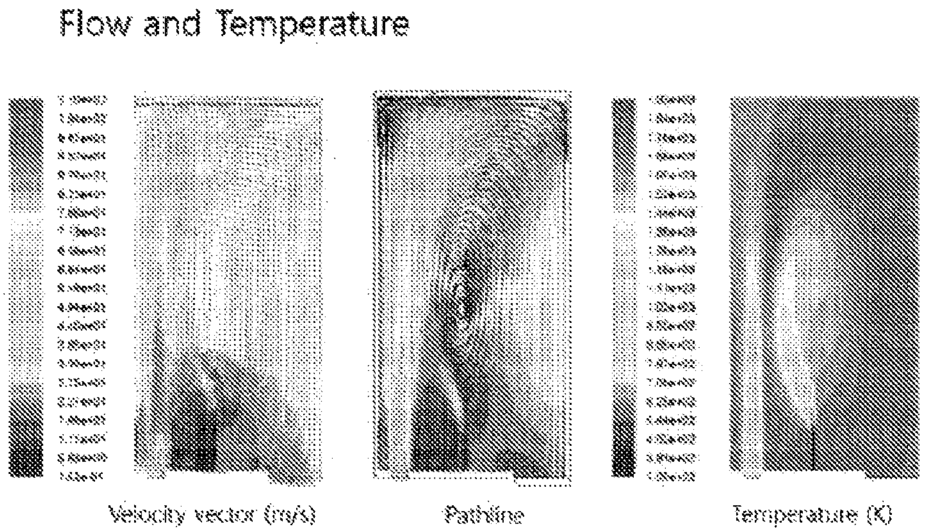
[FIG. 8]
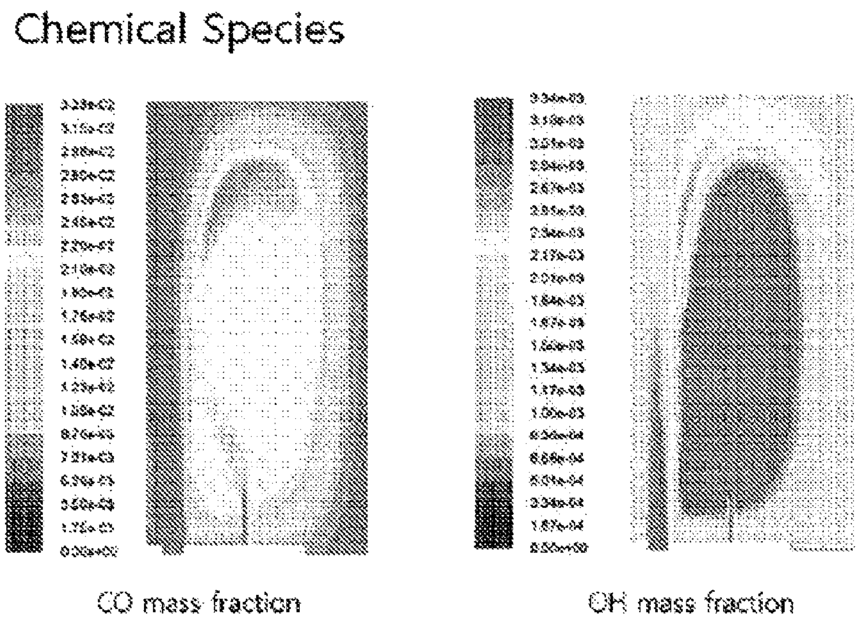

COMBUSTION HEAT GENERATOR WITH RECIRCULATION REGION

CROSS REFERENCE TO RELATED APPLICATIONS

This application is a National Stage of International Application No. PCT/KR2020/001779 filed Feb. 7, 2020, claiming priority based on Korean Patent Application No. 10-2019-0069631 filed Jun. 12, 2019.

FIELD OF INVENTION

The present invention relates to a combustion heat generator, and more particularly to a combustion heat generator with a recirculation region for effectively dissipating heat energy by forming uniform temperature distribution in a combustion chamber.

BACKGROUND OF INVENTION

In general, a combustion heat generator is used to uniformly heat a material to high temperature in various ovens, such as a coke oven, in the steel/material industry.

In addition, a radiant heat dissipation furnace called a radiant tube is used for heating purposes in commercial facilities as well as industrial fields.

In detail, the radiant tube also performs a similar function to a plate-type combustion heat generator by twisting a shape of a circular tube in a zigzag for safety.

However, in a conventional combustion heat generator, temperature is lowered downstream (outlet) of combustion gas. That is, due to this configuration, the fuel and oxidant (mainly, air) are quickly mixed in order to stably burn the fuel, a high-temperature flame is generated, and the temperature is rapidly lowered because heat is not generated after the flame is generated.

In the combustion heat generator, a temperature deviation occurs in an external structure that emits heat due to a temperature difference in the combustion space, and accordingly, the combustion heat generator is not effective due to limitations in uniform heat radiation.

As thermal stress is generated in an area in which the temperature deviation of the combustion heat generator occurs, durability is reduced.

In addition, there is a problem in that a high concentration of nitrogen oxides (NOx) is generated in a high-temperature flame zone of the combustion heat generator.

Technical Solution

In accordance with an aspect of the present invention, the above and other objects can be accomplished by the provision of a combustion heat generator including: a plate-shaped housing having a combustion space therein; an oxidant injector provided on one side of the housing and forming a first circulation region by inputting an oxidant to an outer periphery of an inner side of the combustion space through an oxidant injection nozzle and circulating the oxidant; a gas ejector provided on the other side of the housing and discharging a portion of gas circulating in the combustion space; and a fuel feeder installed so that a front end of a fuel injection nozzle is positioned in a second circulation region formed in a center of the combustion space by circulation of an oxidant in the first circulation region to inject fuel into the second circulation region.

In this case, the housing may be formed in any one shape of a circle, an ellipse, a square, and a polygon.

In addition, the fuel injection nozzle may be symmetrically installed on upper and lower or left and right sides with respect to the central portion of the housing.

In addition, the oxidant injector and the gas ejector may be installed to be spaced apart from each other in parallel to the housing.

In addition, the oxidant injector and the gas ejector may be installed to face each other across the fuel feeder in parallel to both sides of the housing.

In addition, the combustion heat generator may further include: a guide member provided in the combustion space and configured to guide the oxidant injected through the oxidant injector to circulate the oxidant in one direction.

In addition, the gas ejector of the combustion heat generator may be connected to an oxidant injector of an adjacent combustion heat generator to successively install the plurality of combustion heat generators in series.

Further, a heat exchanger for increasing temperature of an oxidant input through the oxidant injector and temperature of fuel input through the fuel feeder using heat of gas discharged through the gas ejector may be provided on one side of the housing.

Effect of Invention

The combustion heat generator with a recirculation region according to the present invention as configured above may form uniform temperature distribution in a combustion chamber by forming a gas recirculation region around a central part of a combustion space in a housing and injecting fuel into the gas recirculation region to generate space combustion based on the recirculation region.

Thus, heat energy may be effectively dissipating heat energy through the combustion heat generator, and problems of durability degradation of an external structure due to temperature non-uniformity of existing combustion heat generator may be overcome.

In addition, nitrogen oxides ($NO_x$) generated during combustion at high temperature may be reduced.

DESCRIPTION OF DRAWINGS

FIG. 1 is a perspective view showing a combustion heat generator according to the present invention.

FIG. 2 is a front sectional view showing the internal configuration of a combustion heat generator according to the present invention.

FIG. 3 is a front sectional view of a combustion heat generator according to another embodiment of the present invention.

FIG. 4 is a front view showing an embodiment in which the combustion heat generator of FIG. 5 are connected in series.

FIG. 5 shows another embodiment in which the combustion heat generator of FIG. 2 is provided with a plurality of fuel injection nozzles.

FIG. 6 shows another embodiment in which the combustion heat generator of FIG. 2 is provided with a heat exchanger.

FIGS. 7 and 8 are data showing the results of computational analysis of combustion heat generator according to the present invention.

BEST MODE

Hereinafter, the configuration and operation of specific embodiments of the present invention will be described in detail with reference to the accompanying drawings.

Here, when reference numerals are applied to constituents illustrated in each drawing, it should be noted that like reference numerals indicate like elements throughout the specification.

FIG. 1 is a perspective view showing a combustion heat generator according to the present invention. FIG. 2 is a front sectional view showing the internal configuration of a combustion heat generator according to the present invention.

Referring to FIG. 1, a combustion heat generator 1 according to an exemplary embodiment of the present invention may include a housing 100, an oxidant injector 110, a gas ejector 120, and a fuel feeder 130.

The configuration according to the present invention will be described below in detail.

First, the housing 100 constitutes a main body of the combustion heat generator 1, and may be formed in a plate shape in which a combustion space 101 is provided.

In detail, the housing 100 may be formed in any one of a circular shape, an oval shape, a rectangular shape, and a polygonal shape. In the present invention, a case in which the housing 100 is formed in a rectangular plate shape will be described. However, the present invention is not limited thereto, and various modifications may be applied as long as an oxidant and fuel injected into the combustion space 101 may be circulated smoothly.

In this way, when the housing 100 is formed in a plate shape, only two-dimensional flow is possible in the combustion space 101 inside the housing 100, and three-dimensional flow in the thickness direction of the housing 100 is impossible.

That is, since the combustion heat generator 1 having a plate shape is formed to have a large area and a relatively thin thickness, two-dimensional flow is possible. Accordingly, uniform thermal efficiency of the combustion heat generator 1 may be realized.

Referring to FIG. 2, the oxidant injector 110 is provided on one side of the housing 100 to form a first circulation region (A) by introducing an oxidant into the outer periphery of the inner side of the combustion space 101 and circulating the oxidant.

Specifically, the oxidant injector 110 may have an oxidant injection nozzle 111 having a predetermined length so that an oxidant fed through an oxidant feeder (not shown) is smoothly introduced into a predetermined point of the combustion space 101 in the housing 100.

In this case, the oxidant injection nozzle 111 may be installed at a point where the sides of the rectangular housing 100 meet each other, i.e., a corner of the housing 100, so as to form the first circulation region (A) by injecting an oxidant into the outer periphery of the inner side of the combustion space 101.

As another embodiment, when the housing 100 is formed in a circular shape (not shown), the oxidant injection nozzle 111 may be installed to be inclined at a predetermined angle in the tangential direction of the circle. Accordingly, by injecting an oxidant into the outer periphery of the inner side of the circular combustion space 101, the first circulation region (A) may be efficiently formed.

The gas ejector 120 may be provided on the other side of the housing 100 and serves to discharge a portion of gas circulating in the combustion space 101 to the outside.

Specifically, the oxidant injector 110 and the gas ejector 120 may be disposed on one side of the housing 100 to be spaced apart from each other in parallel.

As another embodiment, as shown in FIG. 3, the oxidant injector 110 and the gas ejector 120 may be installed with the fuel feeder 130 to be described later therebetween. In this case, the oxidant injector 110 and the gas ejector 120 may be installed on both sides of the housing 100 and arranged in a line to face each other.

Referring to FIG. 4, as described above, when the oxidant injector 110 and the gas ejector 120 are installed on both sides of the housing 100 and arranged in a line to face each other, a plurality of combustion heat generator 1 according to the present invention may be installed in series to form a lateral heat sink system.

That is, the gas ejector 120 installed on the other side of the firstly disposed combustion heat generator 1 may be connected to the oxidant injector 110 installed on one side of the other adjacent combustion heat generator 1'.

That is, the gas ejector 120 of the first combustion heat generator 1 becomes the oxidant injector 110 of the combustion heat generator 1 connected to the first combustion heat generator 1.

Accordingly, gas discharged through the gas ejector 120 of the first combustion heat generator 1 may be re-injected through the oxidant injector 110 of the adjacent combustion heat generator 1. Thus, a long heat sink may be formed, and the efficiency of the combustion heat generator 1 may be improved through dispersed injection of fuel.

In this case, in the combustion space 101 inside the housing 100 constituting the combustion heat generator 1, a guide member 103 (see FIG. 3) for guiding an oxidant may be provided so that an oxidant injected through the oxidant injector 110 is circulated in one direction of the combustion space 101.

That is, when a plurality of combustion heat generator 1 is installed in series, it is necessary to change the flow direction of an oxidant injected into the combustion space 101 through the oxidant injector 110 to a desired direction (e.g., clockwise in FIG. 3).

Accordingly, by installing the guide member 103 in the vicinity of the combustion space 101 of the housing 100 in which the oxidant injector 110 is installed, the flow direction of an oxidant injected into the combustion space 101 through the oxidant injection nozzle 111 may be changed to a desired direction. Thus, the first circulation region (A) may be smoothly formed.

The fuel feeder 130 serves to inject fuel into a second circulation region (B) formed near the center of the combustion space 101 by circulation of an oxidant in the first circulation region (A). The fuel feeder 130 may be installed so that the front end of a fuel injection nozzle 131 is located in the second circulation region (B).

Specifically, at least one fuel injection nozzle 131 of the fuel feeder 130 may be positioned between the oxidant injector 110 and the gas ejector 120.

Referring to FIG. 5, as another embodiment, at least one pair of the fuel injection nozzles 131 may be symmetrically installed on the upper and lower sides or left and right sides with respect to the center of the housing 100 so as to increase the fuel injection efficiency of the fuel feeder 130.

Referring to FIG. 6, a heat exchanger 140 may be provided at one side of the housing 100. The heat exchanger 140 may use the heat of gas discharged through the gas ejector 120 to increase the temperature of an oxidant input through the oxidant injector 110 and the temperature of fuel input through the fuel feeder 130. Accordingly, the heat exchanger 140 may improve the thermal efficiency of the combustion heat generator 1.

Then, an operation of the combustion heat generator 1 including a recirculation region according to the present invention as configured above will be described.

First, an oxidant may be injected to flow into an inner circumference of the combustion space 101 through the oxidant injector 110 provided at one side of the housing 100 to provide the first circulation region A. Simultaneously, a predetermined second circulation region B may be provided by the first circulation region A adjacent to the central part of the combustion space 101.

In this case, some of gas circulated inside the combustion space 101 may be discharged through the gas ejector 120 provided at the other side of the housing 100.

The fuel feeder 130 may spray fuel through the fuel injection nozzle 131, a fore end of which is positioned inside the second circulation region B, and thus may generate space combustion inside the combustion space 101 based on the second circulation region B.

That is, fuel sprayed to the second circulation region B may be turned while being gradually mixed with the oxidant in the first circulation region A.

Accordingly, uniform temperature distribution in the combustion space 101 of the combustion heat generator 1 may be formed by uniform reaction and heat release that are the characteristic of space combustion.

As such, uniform temperature distribution formed in the combustion space 101 may overcome problems of efficiency degradation and durability degradation of an external structure due to temperature non-uniformity of existing combustion heat generator, and in particular may reduce nitrogen oxides ($NO_x$) generated during combustion in high-temperature flames.

FIGS. 7 and 8 show the computational analysis results of the combustion heat generator 1 according to the present invention.

First, the housing 100 was formed to have a size of 5 m in width, 2.5 m in length, and 1 m in thickness so that the combustion heat generator 1 according to the present invention were used for computational analysis. In this case, the thickness of a metal plate constituting the housing 100 was 0.1 m, and the fuel injection nozzle 131 was configured to enter 0.7 m from the wall surface of the housing 100 to the inside.

In addition, gas residence time in the housing 100 was set to 2 seconds, and equivalence ratio was set to 0.9 to allow 10% excess air to enter. In addition, methane was used as fuel fed through the fuel feeder 130.

A computational analysis code used was ANSYS-FLUENT 17.0, a standard k-e model was used as a turbulence model, a discrete-ordinate model was used as a radiation model, and a skeletal model of 46 steps was used for chemical reaction.

As shown in FIG. 7, it can be confirmed that, in the combustion heat generator 1 according to the present invention, through the oxidant injector 110, the gas ejector 120, and the fuel feeder 130 installed in the housing 100, the first circulation region (A) and the second circulation region (B) are formed inside the combustion space 101.

In particular, as shown in FIG. 8, a fuel-rich region and a reaction activation region in the first circulation region (A) and the second circulation region (B) of the combustion space 101 may be identified from CO and OH concentration distributions.

That is, as shown in the computational analysis results, it can be confirmed that, the combustion heat generator 1 according to the present invention may ensure a uniform temperature distribution in an entire area except for air and a fuel jet in the combustion space 101.

As described above, the present invention has been described with reference to certain preferred embodiments, but the present invention is not limited to the above-described embodiments, and various changes and modifications may be made without departing from the spirit of the present invention.

DESCRIPTION OF SYMBOLS

1: COMBUSTION HEAT GENERATOR
100: HOUSING
101: COMBUSTION SPACE
103: GUIDE MEMBER
110: OXIDANT INJECTOR
111: OXIDANT INJECTION NOZZLE
120: GAS EJECTOR
130: FUEL FEEDER
131: FUEL INJECTION NOZZLE
140: HEAT EXCHANGER
A: FIRST CIRCULATION REGION
B: SECOND CIRCULATION REGION

The invention claimed is:

1. A combustion heat generator comprising:

a plate-shaped housing having a combustion space therein;

an oxidant injector provided on a first position of the housing and forming a first circulation region by inputting an oxidant to an outer periphery of an inner side of the combustion space through an oxidant injection nozzle and circulating the oxidant;

a gas ejector provided on a second position of the housing and discharging a portion of gas circulating in the combustion space; and a fuel feeder installed so that a front end of a fuel injection nozzle is extended into the housing and positioned in a second circulation region formed in a center of the combustion space by circulation of an oxidant in the first circulation region to inject only fuel into the second circulation region, wherein the first position and the second position are formed on the same side of the housing respectively, wherein space combustion is generated in the combustion space based on the second circulation region while the fuel injected into the second circulation region is gradually mixed with the oxidant circulating along the first circulation region and diffused into the first circulation region, wherein a gas recirculation region by the first circulation and the second circulation is formed in the housing and the space combustion is generated based on the gas recirculation region, and wherein the oxidant and the fuel recirculate in one direction in the housing.

2. The combustion heat generator according to claim 1, wherein the housing is formed in any one shape of a circle, an ellipse, a rectangle, and a polygon.

3. The combustion heat generator according to claim 1, wherein the oxidant injector and the gas ejector are installed to be spaced apart from each other in parallel to the housing.

4. The combustion heat generator according to claim 1, further comprising:

a guide member provided in the combustion space and configured to guide the oxidant injected through the oxidant injector to circulate the oxidant in one direction.

5. The combustion heat generator according to claim 1, wherein the gas ejector of the combustion heat generator is connected to an oxidant injector of an adjacent combustion heat generator to successively install the plurality of combustion heat generators in series.

6. The combustion heat generator according to claim 1, further comprising:

a heat exchanger for increasing temperature of an oxidant input through the oxidant injector and temperature of fuel input through the fuel feeder using heat of gas discharged through the gas ejector is provided on one side of the housing.

* * * * *